United States Patent Office 3,268,549
Patented August 23, 1966

3,268,549
CATIONIC DYESTUFFS AND A PROCESS
FOR PREPARING THEM
Edwin Baier, Frankfurt am Main, Germany, assignor to
Farbwerke Hoechst Aktiengesellschaft vormals Meister
Lucius & Brüning, Frankfurt am Main, Germany, a
corporation of Germany
No Drawing. Filed Oct. 1, 1963, Ser. No. 312,841
Claims priority, application Germany, Oct. 3, 1962,
F 37,956
7 Claims. (Cl. 260—314.5)

The present invention is concerned with water-soluble cationic dyestuffs and a process for preparing them; especially it relates to water-soluble cationic dyestuffs of the following general formula

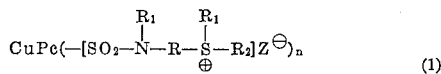
(1)

in which CuPc represents copper phthalocyanine, R represents an alkylene or arylene alkyl group which may be interrupted by heteroatoms, for example, nitrogen, sulfur or oxygen atoms, $R_1$ and $R_2$ each represent an alkyl or aralkyl group, $Z^\ominus$ represents an anion and $n$ stands for a number from 2 to 4.

It has now been found that water-soluble cationic dyestuffs of the following general Formula 1

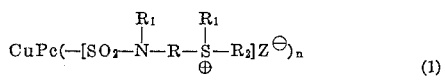
(1)

in which CuPc represents copper phthalocyanine, R represents an alkylene or arylene alkyl group, which may be interrupted by heteroatoms, for example, nitrogen, sulfur or oxygen atoms, $R_1$ and $R_2$ each represent an alkyl or aralkyl group, $Z^\ominus$ represents an anion and $n$ stands for a number from 2 to 4, can be prepared by reacting dyestuffs of the following general Formula 2

$$CuPc(-SO_2-NH-R-SH)_n \quad (2)$$

in which CuPc, R and $n$ have the meanings given above, in an aqueous alkaline solution, suitably in an aqueous sodium hydroxide solution, with alkylating or aralkylating agents, to yield the corresponding dyestuff thioether of the following general Formula 3

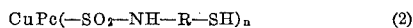
(3)

in which CuPc, R, $R_1$ and $n$ have the meanings given above, drying the resulting compound and reacting it again with alkylating or aralkylating agents.

The reaction of the starting dyestuffs of general Formula 2 given above with alkylating or aralkylating agents, for example, methyl iodide, benzyl chloride, dimethyl sulfate, diethyl sulfate or o-toluene sulfonic acid methyl ester, in an aqueous alkaline solution is suitably carried out at a temperature within the range of about 40° to 80° C. The dyestuff thioether thus obtained is separated from the aqueous phase, washed with water until neutral and dried, the drying being suitably carried out at a temperature within the range of about 40° to 100° C. The dyestuff thioether which has thus been freed from water is introduced, while stirring, into the alkylating or aralkylating agent or into a mixture of such an agent with an organic solvent, for example, dimethyl formamide, benzene, toluene or nitrobenzene, and reacted therein for 1 to 3 hours at a temperature within the range of about 80° to 120° C., preferably at about 100° C.

The dyestuffs corresponding to general Formula 2 indicated above, which are used as starting compounds can be prepared by subjecting the corresponding dyestuffs which have the following general Formula 4

$$CuPc(-SO_2-NH-R-SSO_3H)_n \quad (4)$$

to a hydrolysis in an acid medium (cf. Belgian Patent 590,125).

The dyestuffs according to the invention are obtained in a good to very good yield and can well be used for dyeing animal or vegetable fibrous materials. The dyeings produced on the said materials are distinguished by good wet-fastness properties and clear brilliant tints.

The following examples serve to illustrate the invention but they are not intended to limit it thereto, the parts being by weight unless otherwise stated and the relationship of parts by weight to parts by volume being the same as that of the kilogram to the liter.

Example 1

12 parts of copper phthalocyanine-tris-(sulfonyl-aminoethyl-mercaptane) of the formula $$CuPc(-SO_2-NH-CH_2-CH_2-SH)_3$$

(obtainable by hydrolysis of a dyestuff of the formula $$CuPc(-SO_2-NH-CH_2-CH_2-S-SO_3H)_3$$

in hydrochloric acid) were dissolved, while stirring, in 120 parts by volume of 2 N-sodium hydroxide solution. The resulting solution was heated to 40° C. and 25 parts of dimethyl sulfate were introduced dropwise at this temperature. When the addition was terminated the mixture was stirred for 1 hour at 60° C., then heated to 80° C. and kept at this temperature for another 15 minutes. The precipitate was filtered off, washed well with water and dried at 60° C.

10 parts of the copper phthalocyanine-tris-(sulfonyl-methylamino-methyl-thioether) thus obtained were introduced, while stirring, at 100° C. in the course of 1 hour into 50 parts of dimethyl sulfate. When the addition was terminated stirring was continued for another hour at 100° C., the mixture was then cooled and 200 parts by volume of acetone were added. The cationic dyestuff of the formula

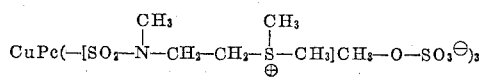

which had formed and precipitated was filtered off, washed with acetone and dried at 40° C. The dyestuff so obtained was a blue powder that dissolved well in water and dyed vegetable and animal fibrous materials brilliant turquoise blue tints. The dyeings thus obtained had a good fastness to wet processing and to light.

When in the two alkylation operations, instead of dimethyl sulfate, the same amounts of diethyl sulfate were used a dyestuff of the following formula

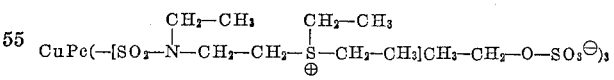

was obtained which had the same tinctorial properties as the dyestuff obtained with the use of dimethyl sulfate.

Example 2

10 parts of copper phthalocyanine-tris-(sulfonyl-aminoethyl-mercaptane), 100 parts by volume of 2 N-sodium hydroxide solution and 20 parts of benzyl chloride were stirred together for 2 hours at 60° C. The dyestuff thioether of the formula

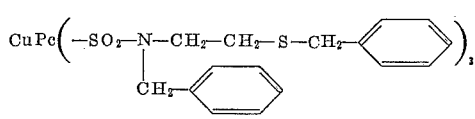

which had thus formed and precipitated and which was insoluble in water was filtered off, washed with water until it gave a neutral reaction and dried at 100° C. 12 parts of the compound thus obtained were introduced in the course of 1 hour at 80° C. into 40 parts of dimethyl sulfate. After the addition was terminated the mixture was heated to 110° C. and kept for 90 minutes at this temperature. It was then cooled to room temperature. 200 parts by volume of acetone were added. The precipitated dyestuff was filtered off, washed again with acetone, dissolved in 500 parts by volume of water and precipitated again by the addition of 30 parts of sodium chloride. The cationic dyestuff of the formula

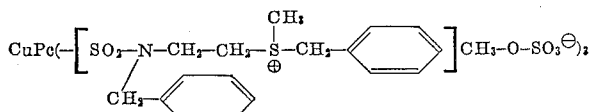

that was filtered off was dried at 40° C. The dyestuff thus obtained was well soluble in water and dyed animal and vegetable fibrous materials clear turquoise blue tints. The dyeings produced with this dyestuff had good wet-fastness properties.

When instead of 20 parts of benzyl chloride 12 parts of propyl chloride were used a dyestuff of the following formula

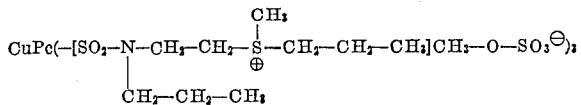

was obtained in the form of a blue water-soluble powder whose tinctorial and fastness properties were similar to those of the dyestuff obtained with the use of 20 parts of benzyl chloride.

*Example 3*

10 parts of the dyestuff of the formula

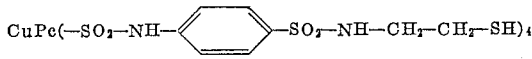

(obtainable by hydrolyzing a dyestuff of the formula

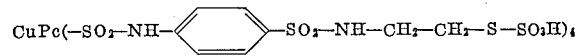

with hydrochloric acid) were dissolved, while stirring, at 40° C. in 200 parts by volume of 2 N-sodium hydroxide solution. Into the resulting solution 35 parts of dimethyl sulfate were introduced. The whole was then heated to 80° C. and kept for 2 hours at this temperature. The precipitated dyestuff was then filtered off, washed with water until it gave a neutral reaction and dried at 60° C.

8 parts of the dyestuff thioether of the formula

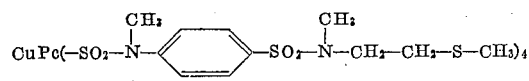

that was thus obtained were introduced, while stirring, at 100° C. in the course of 1 hour into 60 parts of dimethyl sulfate. Stirring was continued for 2 hours at 100° C. The mixture was then cooled and 200 parts by volume of acetone were added. The precipitated dyestuff was filtered off, washed with acetone and dried at 40° C. The resulting dyestuff of the formula

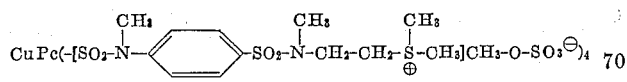

was a blue powder which was easily soluble in water and dyed vegetable and animal fibrous materials brilliant turquoise blue tints. The dyeings produced with this dyestuff had good wet-fastness properties.

*Example 4*

10 parts of the dyestuff of the formula

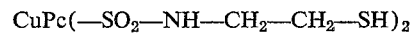

(obtainable by hydroylzing a dyestuff of the formula

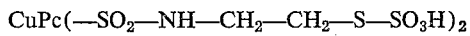

with hydrochloric acid) were reacted twice with dimethyl sulfate in the manner described in Example 3. A dyestuff of the following formula

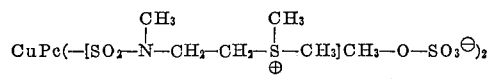

was obtained in the form of a blue water-soluble powder which dyed vegetable and animal fibrous materials clear turquoise blue tints of a good fastness to wet processing and to light.

I claim:

1. Water-soluble cationic dyestuffs of the formula

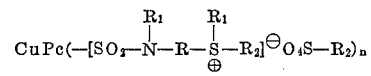

in which CuPc represents copper phthalocyanine, $R_1$ represents a member of the group consisting of lower alkyl and benzyl, R represents a member of the group consisting of $-CH_2-CH_2-$ and

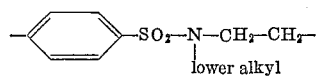

$R_2$ represents lower alkyl, and $n$ represents a number from 2 to 4.

2. The water-soluble cationic dyestuff of the formula

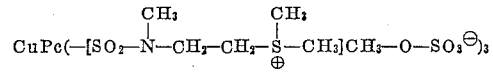

3. The water-soluble cationic dyestuff of the formula

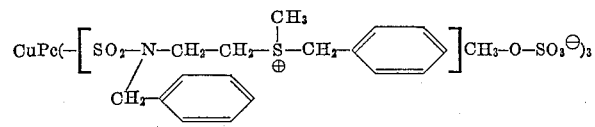

4. The water-soluble cationic dyestuff of the formula

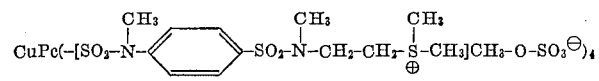

5. The water-soluble cationic dyestuff of the formula

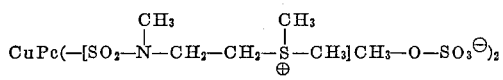

6. The water-soluble cationic dyestuff of the formula

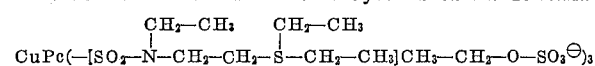

7. A process for preparing water-soluble cationic dyestuffs of the Formula 1

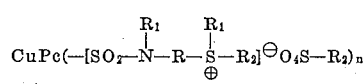    (1)

in which CuPc represents copper phthalocyanine, $R_1$ represents a member of the group consisting of lower alkyl and benzyl, R represents a member of the group consisting of $-CH_2-CH_2-$ and

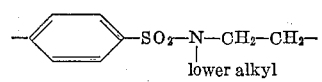

$R_2$ represents lower alkyl, and $n$ represents a number from 2 to 4, which comprises reacting a dyestuff of the Formula 2

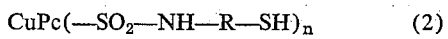    (2)

in which CuPc, R and $n$ have the meanings given above, with an alkylating agent of the group consisting of lower dialkyl sulfate and benzylchloride in an aqueous-alkaline solution at a temperature ranging from about 40° to about 80° C. and reacting the dyestuff thioethers of the Formula 3

$$CuPc(-SO_2-\underset{\underset{R_1}{|}}{N}-R-S-R_1)_n \quad (3)$$

in which CuPc, $R_1$, R and $n$ have the meanings given above, so obtained, after drying, with a lower dialkyl sulfate at a temperature ranging from about 80° to about 120° C.

No references cited.

WALTER A. MODANCE, *Primary Examiner.*

J. PATTEN, *Assistant Examiner.*